US00RE36338E

United States Patent [19]

Fukuoka

[11] E Patent Number: Re. 36,338

[45] Reissued Date of Patent: Oct. 12, 1999

[54] ELECTRONIC STILL CAMERA FOR RECORDING AND REGENERATING IMAGE DATA AND SOUND DATA

[75] Inventor: Hiroki Fukuoka, Yokohama, Japan

[73] Assignee: Ricoh Company, Ltd., Tokyo, Japan

[21] Appl. No.: 08/886,285

[22] Filed: Jul. 1, 1997

Related U.S. Patent Documents

Reissue of:

[64] Patent No.: 5,436,657
Issued: Jul. 25, 1995
Appl. No.: 08/237,205
Filed: May 3, 1994

[30] Foreign Application Priority Data

Jul. 8, 1993 [JP] Japan ..... 5-169083

[51] Int. Cl.[6] ..... H04N 5/225; H04N 5/76

[52] U.S. Cl. ..... 348/232; 348/220; 348/239; 358/909.1

[58] Field of Search ..... 348/220, 222, 348/231, 232, 239, 910; 358/909.1, 906; H04N 5/228, 5/76, 5/225

[56] References Cited

U.S. PATENT DOCUMENTS 5,153,730 10/1992 Nagasaki ..... 348/231
5,262,868 11/1993 Kaneko ..... 358/909.1
5,295,077 3/1994 Fukuoka .
5,335,072 8/1994 Tanaka ..... 358/909.1

FOREIGN PATENT DOCUMENTS 2-280484 11/1990 Japan .

*Primary Examiner*—Sherrie Hsia
*Attorney, Agent, or Firm*—Oblon, Spivak, McClelland, Maier & Neustadt, P.C.

[57] ABSTRACT

An electronic still camera has a photographing device for photographing a photographed object and outputting interlaced image data; an image data encoder for encoding the image data, an image recorder for recording the coded image data to a recording medium; a sound converter for converting a sound to an electric signal; a sound data encoder for encoding sound data converted to the electric signal; a sound recorder for recording the coded sound data to the recording medium; an image data reader for reading the coded image data from the recording medium; an image decoder for decoding the read image data; a sound data reader for reading the coded sound data from the recording medium; a sound decoder for decoding the read sound data; and a controller for displaying only a first or second field image when a still image is regenerated during regeneration of a continuous image. A central processing unit (CPU) continuously regenerates only the first (odd) or second (even) field image when the still image is regenerated during the continuous image regeneration so as to prevent moving image portions of the first and second field images from being blurred.

31 Claims, 8 Drawing Sheets

| | | | | | | | |
|---|---|---|---|---|---|---|---|
| odd 1 | even 2 | odd 3 | even 4 | odd 5 | even 6 | odd 7 | even 8 |

REGENERATING ORDER---→

Fig. 3A
Related Art

| | | | | | | | |
|---|---|---|---|---|---|---|---|
| odd 1 | even 2 | odd 1 | even 2 | odd 1 | even 2 | odd 1 | even 2 |

REGENERATING ORDER---→

Fig. 3B(1)
Related Art

| | | | | | | | |
|---|---|---|---|---|---|---|---|
| odd 1 | odd 1 | odd 1 | odd 1 | odd 1 | odd 1 | odd 1 | odd 1 |

REGENERATING ORDER---→

Fig. 3B(2)

| | | | | | | | |
|---|---|---|---|---|---|---|---|
| even 2 | even 2 | even 2 | even 2 | even 2 | even 2 | even 2 | even 2 |

REGENERATING ORDER---→

Fig. 3B(3)

| | | | | | | | |
|---|---|---|---|---|---|---|---|
| odd 1 | even 2 | odd 1 | even 2 | odd 3 | even 4 | odd 3 | even 4 |

REGENERATING ORDER ---→

Fig. 3C(1)
Related Art

| | | | | | | | |
|---|---|---|---|---|---|---|---|
| odd 1 | odd 1 | even 2 | even 2 | odd 3 | odd 3 | even 4 | even 4 |

REGENERATING ORDER ---→

Fig. 3C(2)

| | | | | | | | |
|---|---|---|---|---|---|---|---|
| odd 7 | even 8 | odd 5 | even 6 | odd 3 | even 4 | odd 1 | even 2 |

REGENERATING ORDER ---→

Fig. 3D(1)
Related Art

| | | | | | | | |
|---|---|---|---|---|---|---|---|
| even 8 | odd 7 | even 6 | odd 5 | even 4 | odd 3 | even 2 | odd 1 |

REGENERATING ORDER ---→

Fig. 3D(2)

ELECTRONIC STILL CAMERA FOR RECORDING AND REGENERATING IMAGE DATA AND SOUND DATA

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an electronic still camera in which image data of a photographed object and sound data can be recorded to a recording medium and can be regenerated from the recording medium.

2. Description of the Related Art

For example, Japanese Patent Application Laying Open (KOKAI) No. 2-280484 shows an electronic still camera capable of recording and regenerating pictures and sounds. In this camera, a sound is stored to a sound memory while a continuous photographing operation is performed by setting a continuous photographing mode. The stored sound is recorded to a recording medium in accordance with a picture continuously taken. This picture and the sound recorded during the continuous photographing operation are simultaneously regenerated from the recording medium so that it is possible to sufficiently reproduce an atmosphere at a photographing time in this regeneration.

In this electronic still camera, a regenerated image such as a moving image can be obtained by continuously taking pictures at a high speed. For example, in the case of an NTSC signal, this NTSC signal can be obtained if a field image is recorded every 1/60 second and is regenerated. When an image is recorded to the recording medium in this way, it is necessary to record sound data to the recording medium in synchronization with image data.

However, when the moving image is regenerated from the recording medium, sounds are simultaneously regenerated from the recording medium and special regeneration such as video tape recording of VTR is further required. However, no electronic still camera has a function for performing such special regeneration.

For example, when an interlaced moving image is shown by a still image display, a slow display and a reverse display as a frame as it is, a moving image portion is blurred by first and second field images so that no regenerated image of the moving image can be made clear and seen well.

When the moving image is displayed in a still image regenerating mode and a slow regenerating mode and no sounds are regenerated, no atmosphere in a photographed place is reproduced.

No atmosphere in the photographed place is also reproduced when the moving image is displayed in a rapid traverse regenerating mode, a rewind regenerating mode and a reverse regenerating mode and no sounds are regenerated or sounds are regenerated in rapid talking.

SUMMARY OF THE INVENTION

It is therefore an object of the present invention to provide an electronic still camera in which an image and a sound interlaced and recorded to a recording medium can be specially regenerated from this recording medium as a preferable image and a sound having a preferable tone quality.

In accordance with a first construction of the present invention, the above object can be achieved by an electronic still camera comprising photographing means for photographing a photographed object and outputting interlaced image data; image data encoding means for encoding the image data; image recording means for recording the coded image data to a recording medium; sound converting means for converting a sound to an electric signal; sound data encoding means for encoding sound data converted to the electric signal; sound recording means for recording the coded sound data to the recording medium; image data reading means for reading the coded image data from the recording medium; image decoding means for decoding the read image data; sound data reading means for reading the coded sound data from the recording medium; sound decoding means for decoding the read sound data; and control means for displaying only a first or second field image when a still image is regenerated during regeneration of a continuous image.

In accordance with a second construction of the present invention, the electronic still camera has control means for regenerating a first field image plural times and thereafter regenerating a second field image the same plural times in slow regeneration during regeneration of a continuous image.

In accordance with a third construction of the present invention, the electronic still camera has control means for regenerating a first field image after a second field image of the same frame is regenerated in reverse regeneration during regeneration of a continuous image.

In accordance with a fourth construction of the present invention, the sound decoding means has means for detecting a soundless portion of the decoded sound data and means for recording soundless tine information of the sound data. The electronic still camera is constructed such that a sounding unit of the sound data including the position of a still image and a recording time thereof is continuously regenerated when a still image regenerating mode is started during regeneration of a continuous image.

In accordance with a fifth construction of the present invention, the sound decoding means has means for detecting a soundless portion of the decoded sound data and means for recording soundless time information of the sound data. The electronic still camera is constructed such that a sounding unit of the sound data including the position of a slow regenerating image and a recording time thereof is continuously regenerated when a slow regenerating mode is started during regeneration of a continuous image.

In accordance with a sixth construction of the present invention, the sound decoding means has means for detecting a soundless portion of the decoded sound data and means for recording soundless time information of the sound data. The electronic still camera is constructed such that a sounding unit of the sound data including the position of a rapid traverse or rewind regenerating image and a recording time thereof is regenerated at a standard speed when a rapid traverse regenerating mode or a rewind regenerating mode is started during regeneration of a continuous image.

In accordance with a seventh construction of the present invention, the sound decoding means has means for detecting a soundless portion of the decoded sound data and means for recording soundless time information of the sound data. The electronic still camera is constructed such that a sounding unit of the sound data including the position of a reverse reproducing image and a recording time thereof is regenerated at a standard speed when a reverse regenerating mode is started during regeneration of a continuous image.

In the first construction of the above electronic still camera, only a fist or second field image is continuously regenerated in still image regeneration. Accordingly, no moving image portion is blurred with respect to the first and second field images. Therefore, the regenerated image can be made clear and seen well without causing any flicker.

In the second construction of the present invention, after a first field image is regenerated plural times in slow regeneration, a second field image is regenerated the same plural time. Accordingly, similar to the first construction, the regenerated image can be made clear and seen well without causing any flicker.

In the third construction of the present invention, a fat field image is regenerated after a second field image of the same frame is regenerated in reverse regeneration. Accordingly, similar to the first construction, the regenerated image can be made clear and seen well without causing any flicker.

In the fourth or fifth construction of the present invention, when a moving image is regenerate in a still image regenerating mode or a slow regenerating mode, a sounding unit of sound data including a position and a recording time of the regenerated image is continuously regenerated. Accordingly, there is no case in which no sound is regenerated.

In the sixth or seventh construction of the present invention, when a moving image is regenerated in a rapid traverse regenerating mode, a rewind regenerating mode or a reverse regenerating mode, a sounding unit of sound data including a position and a recording time of the regenerated image is regenerated at a standard speed. Accordingly, there is no case in which no sound is regenerated and a sound is regenerated in rapid talking.

Further objects and advantages of the present invention will be apparent from the following description of the preferred embodiments of the present invention as illustrated in the accompanying drawings.

BRIEF DESCRIPTION OF THE DRAWINGS

[FIG. 3 is explanatory view for explaining an image regenerating order when a file recorded as a moving image is regenerated;]

*FIG. 3A illustrates a conventional manner of generating a moving image at a normal regeneration rate;*

*FIG. 3B(1) illustrates a conventional manner of generated a still image including a first field and a second field by alternating the displaying of the first and second fields;*

*FIG. 3B(2) illustrates displaying a still image in accordance with the invention by continuously generating only the first field;*

*FIG. 3B(3) illustrates displaying a still image in accordance with the invention by continuously generating only the second field;*

*FIG. 3C(1) illustrates a conventional manner of generating a moving image at a slow speed;*

*FIG. 3C(2) illustrates regenerating a moving image at a slow generation speed in accordance with the invention;*

*FIG. 3D(1) illustrates a conventional manner of displaying a moving image in a reverse order;*

*FIG. 3D(2) illustrates the displaying of a moving image in a reverse order according to the invention;*

DESCRIPTION OF THE PREFERRED EMBODIMENTS

The preferred embodiments of an electronic still camera in the present invention will next be described in detail with reference to the accompanying drawings.

Figure 1:
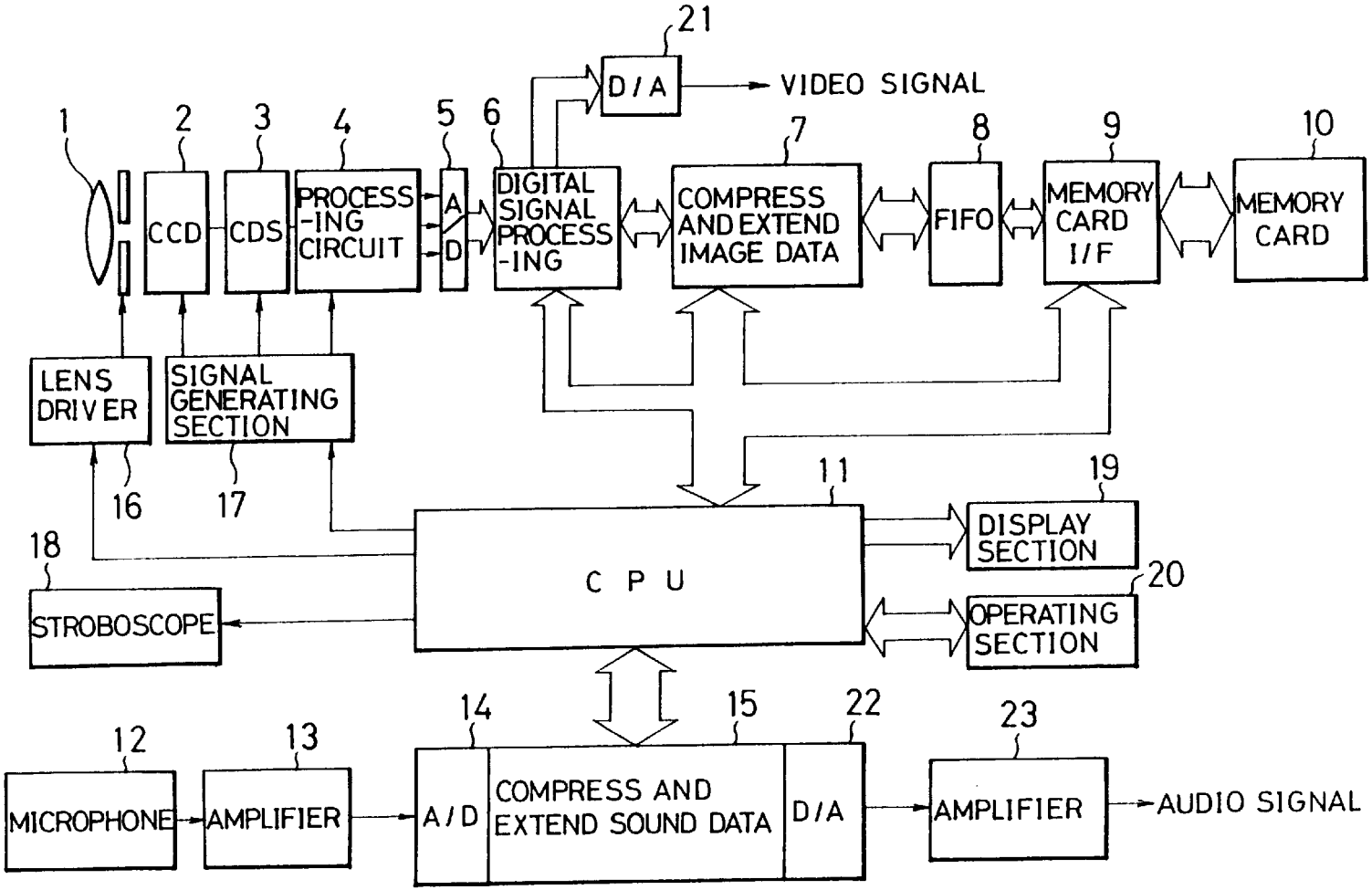
FIG. 1 is a block diagram showing the construction of an electronic still camera in accordance with one embodiment of the invention.

FIG. 1 is a block diagram showing the construction of a digital electronic still camera in accordance with one embodiment of the present invention. An image of a photographed object is focused and formed on a charge coupled device (CCD) 2 as a photographing means by a photographing lens 1. The charge coupled device (CCD) 2 outputs image data by photoelectric conversion based on the photographed image. The outputted image data are gain-controlled by a CDS 3 and a processing circuit 4 and are converted to digital image data by an analog/digital (A/D) converter 5. A gamma correction and an aperture correction of the digital image data are made by a digital signal processing circuit 6. The corrected image data are transmitted to an image data compressing-extending circuit 7 as an image data encoding means and an image decoding means. The image data compressing-extending circuit 7 encodes the image data. The coded image data are inputted to an FIFO circuit 8 and are sequentially recorded to a memory card 10 as a recording medium by an unillustrated well-known data writing-reading means through a memory card I/F (interface) 9. Operations of the above constructional portions are controlled by a central processing unit (CPU) 11.

A sound at a photographing time is inputted to a microphone 12 as a sound converting means and is converted to an electric signal by this microphone 12, This electric signal is amplified by an amplifier 13 and is converted to digital data by an A/D converter 14. The digital data are transmitted to a sound data compressing-extending circuit 15 as a sound data encoding means and a sound decoding means. The sound data compressing-extending circuit 15 encodes the digital data. The coded sound data are sequentially recorded to the memory card 10 by a recording means through the central processing unit (CPU) 11 and the above memory card I/F 9.

In FIG. 1, a lens driver 16 controls a diaphragming amount and a drawing-out amount of the above photographing lens 1, etc. A signal generating section 17 transmits timing signals to the above charge coupled device (CCD) 2, the CDS 3 and the processing circuit 4. A stroboscope 18 is a means for illuminating the photographed object. A display section 19 displays setting states of various kinds of operating modes and operating states of the electronic still camera, etc. An operating section 20 performs various kinds of inputting and setting operations of the electronic still camera.

When image and sound data recorded to the memory card 10 are regenerated therefrom, the image and sound data are read from the memory card 10 and are transmitted to the FIFO circuit 8 or the central processing unit (CPU) 11 through the memory card I/F 9. The image data are extended or decoded by the image data compressing-extending circuit 7 and are outputted as a video signal through the digital signal processing circuit 6 and a D/A converter 21.

In contrast to this, the sound data are transmitted to the sound data compressing-extending circuit 15 from the central processing unit (CPU) 11 and are extended by this sound data compressing-extending circuit 15. The extended data are outputted as an audio signal through a D/A converter 22 and an amplifier 23.

Figure 2:
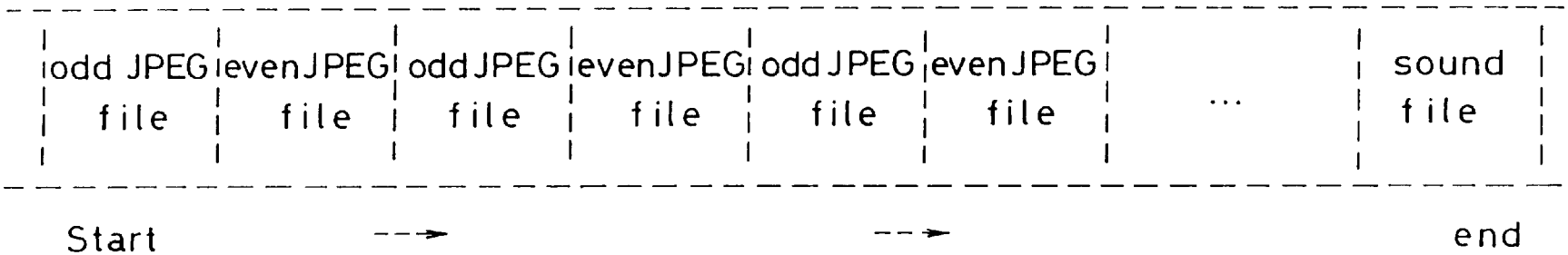
FIG. 2 is an explanatory view showing the construction of a file of image data and sound data recorded to a memory card.

FIG. 2 is an explanatory view showing the construction of a file of image data and sound data recorded to the memory card 10. An odd JPEG file is a first (odd) field image data file. An even JPEG file is a second (even) field image data file. A sound file is a voice file. When a still image is recorded, the image is recorded as a non-interlaced frame in consideration of an image quality and a compression ratio. In contrast to this, when a moving image is recorded, the image is recorded as an interlaced frame to conform an image display to an NTSC display. In this case, a file format is sequentially recorded in an order of a first field and a second field as shown in FIG. 2. In this embodiment, a sound is recorded as a separate independent recording sound file.

[FIG. 3 is explanatory view showing] *FIGS. 3A–3D(2) show* an image regenerating order when a file recorded as a moving image is regenerated. At a normal regenerating time of the electronic still camera, a first (odd) field image and a second (even) field image are regenerated as one frame as shown in [(a) of] FIG. 3*A*.

At a regenerating time of a still image, first and second field images of the same frame are normally regenerated repeatedly as shown in [(b) of] FIG. 3*B*(*1*). In this embodiment, only the first field image is continuously regenerated as shown [by parentheses] in [(b) of] FIG. 3*B*(*2*). Otherwise, only the second field image may be continuously regenerated *as shown in FIG. 3B*(*3*).

At a ½slow regenerating time, first and second field images are normally regenerated repeatedly plural times (N times) as shown in [(c) of] FIG. 3*C*(*1*). Thereafter, the next frame is regenerated. In this embodiment, the first field image is repeatedly regenerated N times such as two times *as illustrated for the first two fields of FIG. 3C*(*2*). Thereafter, the second field image is repeatedly regenerated N times *as illustrated for the third and fourth fields of FIG. 3C*(*2*). Next, a first field image of the next frame is regenerated N times and a second field image thereof is then regenerated repeatedly N times *as illustrated in FIG. 3C*(*2*).

At a reverse regenerating time, first and second field images are normally regenerated as shown in [(d) of] FIG. 3*D*(*1*). Thereafter, a previous frame is regenerated. In this embodiment, after the second field image (*the first field* (*#8*) *of FIG. 3D*(*2*)) is regenerated, the first field image (*the second field* (*#7*) *of FIG. 3D*(*2*)) is regenerated. Next, after a second field image (*field #6 of FIG. 3D*(*2*)) of the previous frame is regenerated, a first field image (*field #5*) of the previous frame is regenerated.

Figure 4:
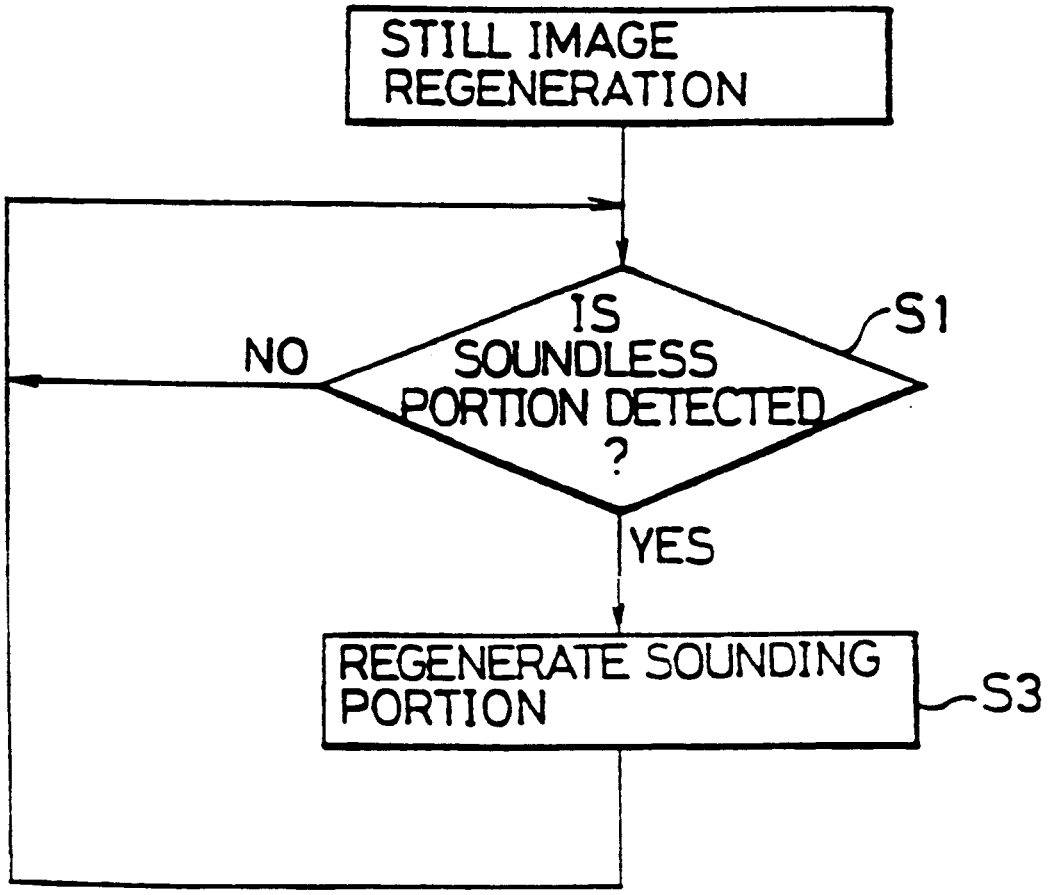
FIG. 4 is a flow chart of sound regeneration at a still regenerating time of the electronic still camera.
Figure 5:
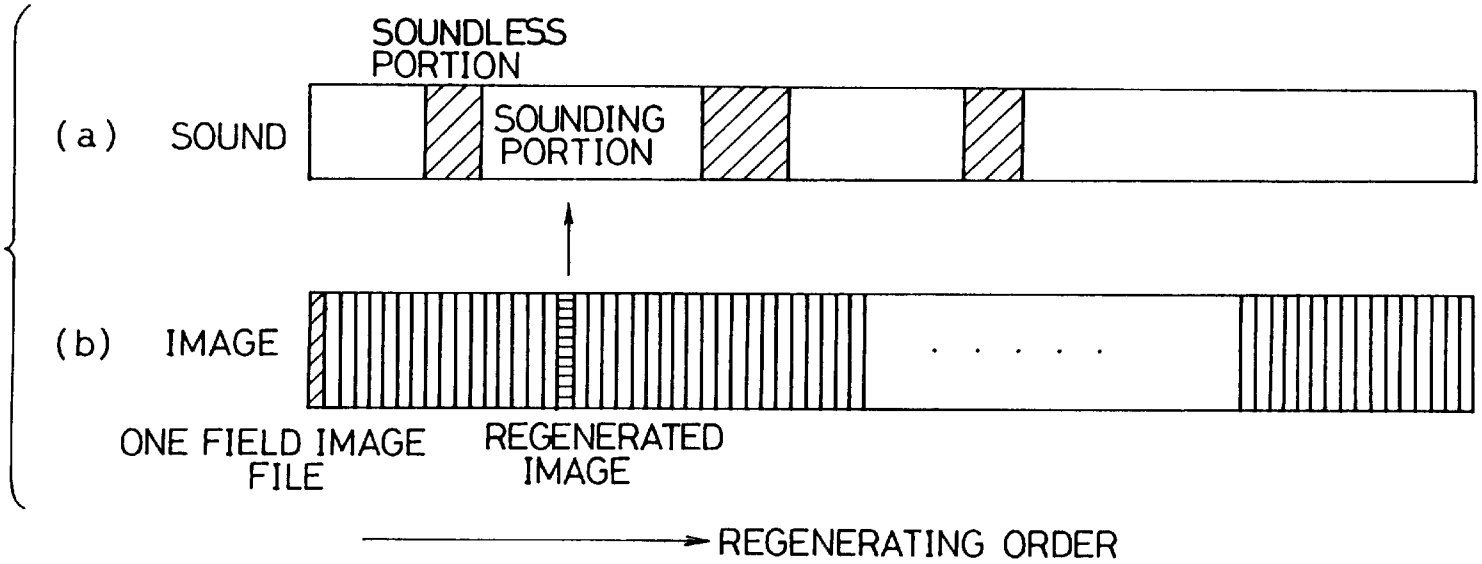
FIG. 5 is explanatory view for explaining correspondence of an image and a sound at a regenerating time of the electronic still camera.

FIG. 4 is a flow chart of sound regeneration at the still regenerating time of the electronic still camera. (a) and (b) of FIG. 5 are explanatory views showing correspondence of an image and a sound at a regenerating time of the electronic still camera When still regeneration is commanded from an operating mode switch of the operating section 20 shown in FIG. 1 at a time of normal regeneration providing a standard regenerating speed, the central processing unit (CPU) 11 regenerates an image in a field in a commanded position. This still regeneration is held until a still regenerating mode is released. A sound is normally regenerated continuously [in a] *when performing* step S1 until a soundless portion of a sound data is detected. The central processing unit (CPU) 11 judges the soundless portion as a portion having no sound when extended sound data within the central process unit (CPU) 11 shows a value equal to or smaller than a certain constant value and this value is continuously detected for a certain constant time. An operation for detecting this soundless portion is also performed at the normal regenerating time. Information about the length of a sounding portion is held within the central processing unit (CPU) 11. When the soundless portion is detected in the still regenerating mode [in a step S2] (*Yes in step S1*), the sounding portion begins to be regenerated from the end of a previous soundless portion in a step S3. This operation is continuously performed repeatedly so that the sound is continuously regenerated at a standard regenerating speed during the still regeneration.

Figure 6:
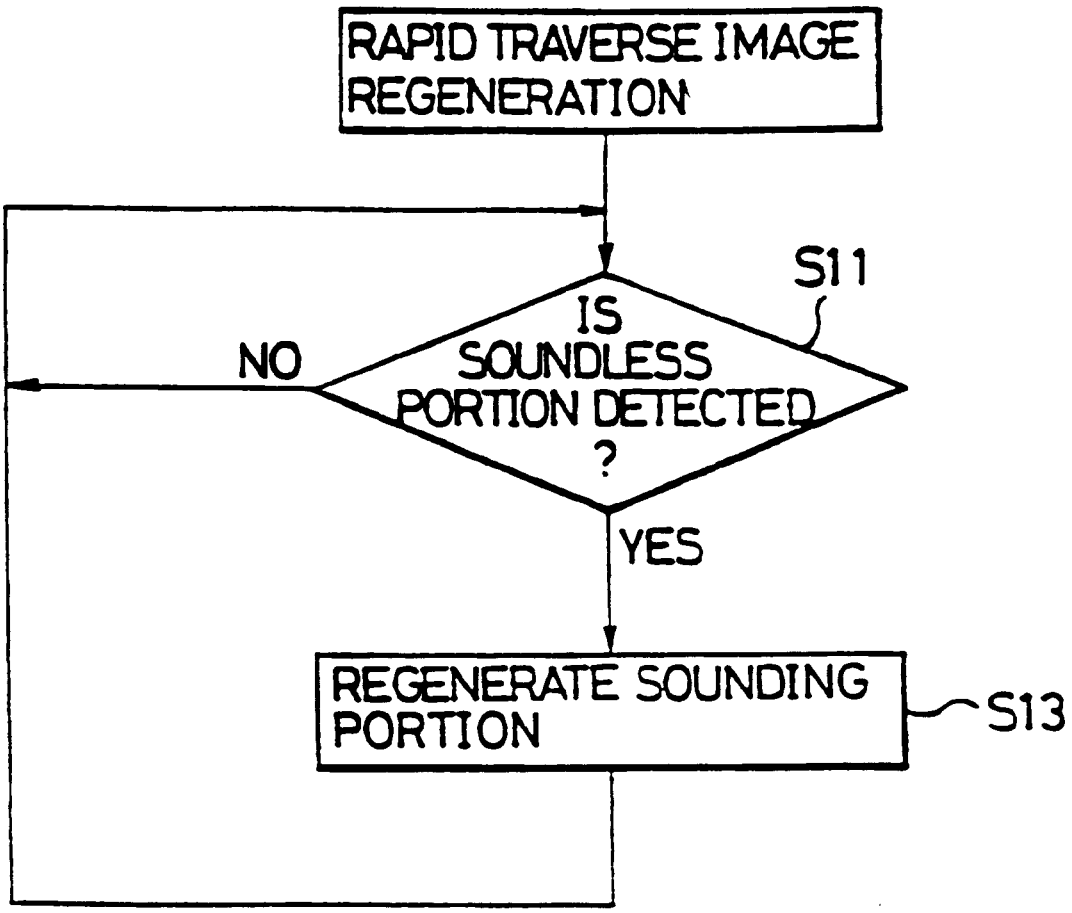
FIG. 6 is a flow chart of sound regeneration at an image rapid traverse or rewind regenerating time of the electronic still camera.

FIG. 6 is a flow chart of sound regeneration at an image rapid traverse or rewind regenerating time of the electronic still camera. When rapid traverse or rewind regeneration is commanded from the operating mode switch at a time of normal regeneration providing a standard regenerating speed, the central processing unit (CPU) 11 regenerates an image by rapid traverse or rewind regeneration at a commanded speed. The rapid traverse or rewind regeneration is held until a rapid traverse or rewind regenerating mode is released. A sound is normally regenerated from the memory card [in a] *when performing* step S11 until a soundless portion of sound data is detected. The central processing unit (CPU) 11 judges the soundless portion as a portion having no sound when extended sound data within the central processing unit 11 shows a value equal to or smaller than a certain constant value and this value is continuously detected for a certain constant time. When the soundless portion is detected in the rapid traverse or rewind regenerating mode [in a step S12], (*Yes in step S11*), the camera in a step S13 begins to regenerate a sounding portion including a sound position corresponding to an image regenerated at a detecting time of this soundless portion. This operation is repeatedly performed so that the sound is continuously regenerated at a standard regenerating speed during the rapid traverse or rewind regeneration.

Figure 7:
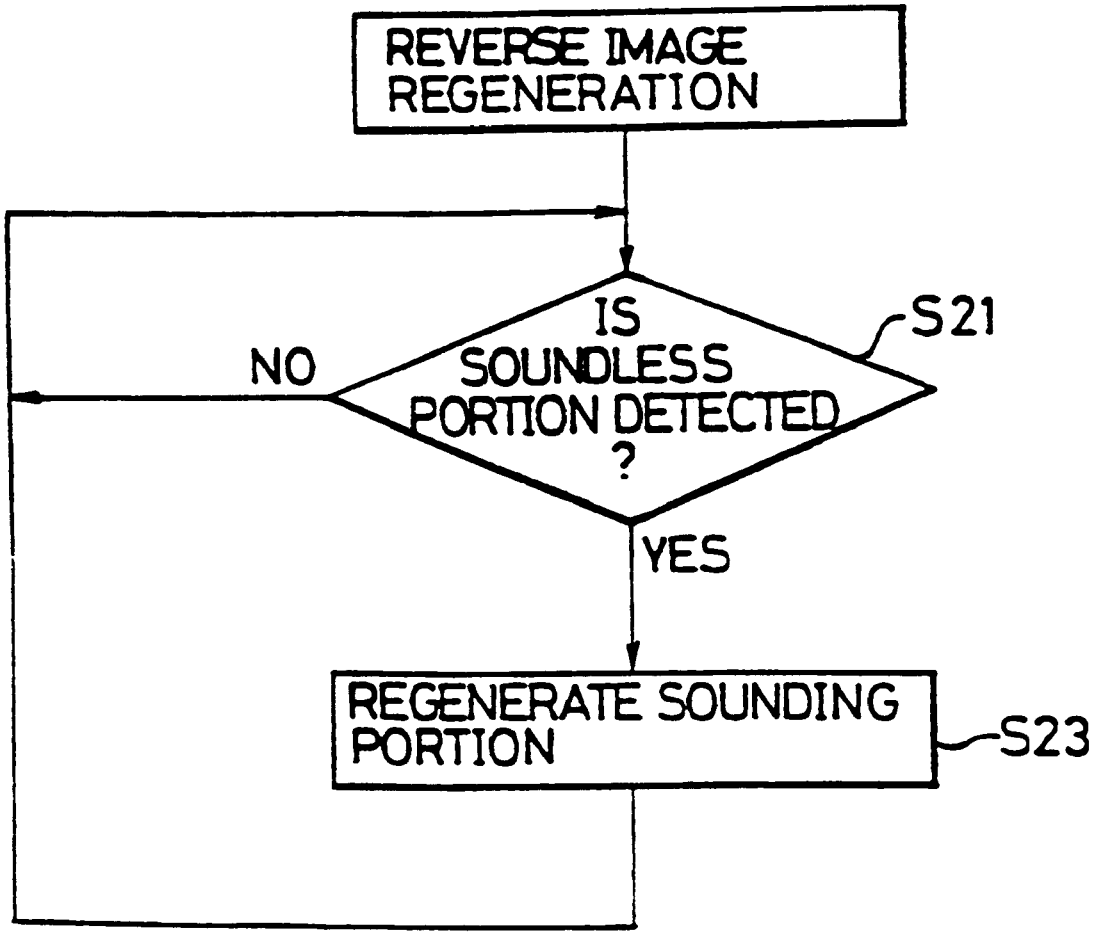
FIG. 7 is a flow chart of sound regeneration at a reverse regenerating time of the electronic still camera.

FIG. 7 is a flow chart of sound regeneration at the reverse regenerating time of the electronic still cameo When reverse regeneration is commanded from the operating mode switch at a time of normal regeneration providing a star regenerating speed, the central pressing unit (CPU) 11 reversely regenerates an image. This reverse regeneration is held until a reverse regenerating mode is released. A sound is normally regenerated from the memory card [in a step] *when performing* S21 until a soundless portion of sound data is detected. The central processing unit (CPU) 11 judges the soundless portion as a portion having no sound when extended sound data within the central processing unit 11 shows a value equal to or smaller than a certain constant value and this value is continuously detected for a certain constant time. When the soundless portion is detected in the reverse regenerating mode [in a step S22] (*Yes in step S21*), the camera in a step S23 begins to regenerate a sounding portion including a sound position corresponding to an image regenerated at a detecting time of this soundless portion. This operation is repeatedly performed so that the sound is continuously regenerated at a standard regenerating speed during the reverse regeneration.

As mentioned above, in accordance with an electronic still camera having a first construction of the present invention, only a first or second field image is continuously regenerated in still image regeneration. Accordingly, the regenerated image can be made clear and seen well without causing any flicker such as blur.

In accordance with a second construction of the present invention, after a first field image is regenerated plural times (N times) in slow regeneration, a second field image is regenerated N times. Accordingly, the regenerated image can be made clear and seen well without causing any flicker such as blur.

In accordance with a third construction of the present invention, a first field image is regenerated after a second field image of the same frame is regenerated in reverse regeneration. Accordingly, the regenerated image can be made clear and seen well without causing any flicker such as blur.

In accordance with a fourth construction of the present invention, when a still image regenerating mode is started during regeneration of a continuous image, a sounding unit of sound data including the position of a still image and a recording time thereof is continuously regenerated. Accordingly, there is no case in which no sound is regenerated. Therefore, it is possible to reproduce a preferable atmosphere at a photographing time of the camera.

In accordance with a fifth construction of the present invention, when a slow regenerating mode is started during regeneration of a continuous image, a sounding unit of sound data including the position of a slow regenerating image and a recording time thereof is continuously regenerated. Accordingly, there is no case in which no sound is regenerated. Therefore, it is possible to reproduce a preferable atmosphere at a photographing time of the camera.

In accordance with a sixth construction of the present invention, when a rapid traverse or rewind regenerating mode is started during regeneration of a continuous image, a sounding unit of sound data including the position of a rapid traverse or rewind regenerating image and a recording time thereof is regenerated at a standard speed. Accordingly, there is no case in which sounds are regenerated in an abnormal slate such as rapid talking, etc. and no sounds are regenerated. Therefore, it is possible to reproduce a preferable atmosphere at a photographing time of the camera.

In accordance with a seventh construction of the present invention, when a reverse regenerating mode is started during regeneration of a continuous image, a sounding unit of sound data including the position of a reverse regenerating image and a recording time thereof is regenerated at a standard speed. Accordingly, there is no case in which no sounds are regenerated. Therefore, it is possible to reproduce a preferable atmosphere at a photographing time of the camera.

Many widely different embodiments of the present invention may be constructed without departing from the spirit and scope of the present invention. It should be understood that the present invention is not limited to the specific embodiments described in the specification, except as defined in the appended claims.

What is claimed is:

1. An electronic still camera comprising:

photographing means for photographing a photographed object and outputting interlaced image data;

image data encoding means for encoding the image data;

image recording means for recording the coded image data to a recording medium;

sound converting means for converting a sound to an electric signal;

data encoding means for encoding sound data converted to the electric signal;

sound recording means for recording the coded sound data to the recording medium;

image data reading means for reading the coded image data from the recording medium;

image decoding means for decoding the read image data;

sound data reading means for reading the coded sound data from the recording medium;

sound decoding means for decoding the read sound data; and control means connected to each of said photographing means, said image data encoding means, said image recording means, said sound data encoding means, said sound recording means, said image data reading means, said image decoding means, said sound data reading means and said sound decoding means for displaying only a first or second field image when a still image is regenerated during regeneration of a continuous image.

2. An electronic still camera comprising:

photographing means for photographing a photographed object and outputting interlaced image data;

image data encoding means for encoding the image data;

image recording means for recording the coded image data to a recording medium;

sound converting means for converting a sound to an electric signal;

sound data encoding means for encoding sound data converted to the electric signal;

sound recording means for recording the coded sound data to the recording medium;

image data reading means for reading the coded image data from the recording medium;

image decoding means for decoding the read image sound data reading means for reading the coded sound data from the recording medium;

sound decoding means for decoding the read sound data; and control means connected to each of said photographing means, said image data encoding means, said image recording means, said sound data encoding means, said sound recording means, said image data reading me, said image decoding means, said sound data reading means and said sound decoding means for regenerating a first field image plural times and thereafter regenerating a second field image the same plural times in slow regeneration during regeneration of a continuous image.

3. An electronic still camera comprising:

photographing means for photographing a photographed object and outputting interlaced image data;

image data encoding means for encoding the image data;

image recording means for recording the coded image data to a recording medium;

sound converting means for converting a sound to an electric signal;

sound data encoding means for encoding sound data converted to the electric signal;

sound recording means for recording the coded sound data to the recording medium;

image data reading means for reading the coded image data from the recording medium;

image decoding means for decoding the read image data;

sound data reading means for reading the coded sound data from the recording medium;

sound decoding means for decoding the read sound data; and control means connected to each of said photographing means, said image data encoding means, said image recording means, said sound data encoding means, said sound recording means, said image data reading means, said image decoding means, said sound data reading means and said sound decoding means for regenerating a first field image after a second field image of the same frame is regenerated in reverse regeneration during regeneration of a continuous image.

4. An electronic still camera comprising:

photographing means for photographing a photo graphed object and outputting interlaced image data;

image data encoding means for encoding the image data;

image recording means for recording the coded image data to a recording medium;

sound converting means for converting a sound to an electric signal;

sound data encoding means for encoding sound data converted to the electric signal;

sound recording means for recording the coded sound data to the recording medium;

image data reading means for reading the coded image data from the recording medium;

image decoding means for decoding the read image data;

sound data reading means for reading the coded sound data from the recording medium; and sound decoding means for decoding the read sound data;

said sound decoding means having means for detecting a soundless portion of the decoded sound data and means for recording soundless time information of the sound data; and the electronic still camera being constructed such that a sounding unit of the sound data including the position of a still image and a recording time thereof is continuously regenerated when a still image regenerating mode is started during regeneration of a continuous image.

5. An electronic stiff camera comprising:

photographing means for photographing a photographed object and outputting interlaced image data;

image data encoding means for encoding the image data;

image recording means for recording the coded image data to a recording medium;

sound converting means for converting a sound to an electric signal;

sound data encoding means for encoding sound data converted to the electric signal;

sound recording means for recording the coded sound data to the recording medium;

image data reading means for reading the coded image data from the recording medium;

image decoding means for decoding the read image data;

sound data reading means for reading the coded sound data from the recording medium; and sound decoding means for decoding the read sound data;

said sound decoding means having means for detecting a soundless portion of the decoded sound data and means for recording soundless time information of the sound data; and the electronic still camera being constructed such that a sounding unit of the sound data including the position of a slow regenerating image and a recording time thereof is continuously regenerated when a slow regenerating mode is started during regeneration of a continuous image.

6. An electronic still camera comprising:

photographing means for photographing a photographed object and outputting interlaced image data;

image data encoding means for encoding the image data;

image recording means for recording the coded image data to a recording medium;

sound converting means for converting a sound to an electric signal;

sound data encoding means for encoding sound data converted to the electric signal;

sound recording means for recording the coded sound data to the recording medium;

image data reading means for reading the coded image data from the recording medium;

image decoding means for decoding the read image data;

sound data reading means for reading the coded sound data from the recording medium; and sound decoding means for decoding the read sound data;

said sound decoding means having means for detecting a soundless portion of the decoded sound data and means for recording soundless time information of the sound data; and the electronic still camera being constructed such that a sounding unit of the sound data including the position of a rapid traverse or rewind regenerating image and a recording time thereof is regenerated at a standard speed when a rapid traverse regenerating mode or a rewind regenerating mode is started during regeneration of a continuous image.

7. An electronic still camera comprising:

photographing ms for photographing a photographed object and outputting interlaced image data;

image data encoding means for encoding the image data;

image recording means for recording the coded image data to a recording medium;

sound converting means for converting a sound to an electric signal;

sound data encoding means for encoding sound data converted to the electric signal;

sound recording means for recording the coded sound data to the recording medium;

image data reading means for reading the coded image data from the recording medium;

image decoding means for decoding the read image data;

sound data reading means for reading the coded sound data from the recording medium; and sound decoding means for decoding the read sound data;

said sound decoding means having means for detecting a soundless portion of the decoded sound data and means for recording soundless time information of the sound data; and the electronic still camera being constructed such that a sounding unit of the sound data including the position of a reverse reproducing image and a recording time thereof is regenerated at a standard speed when a reverse regenerating mode is started during regeneration of a continuous image.

*8. An electronic camera, comprising:*

*a photographing means for photographing an object and outputting fields of image data;*

*image data encoding means for encoding the image data;*

*image recording means for recording the coded image data on a recording medium;*

*image data reading means for reading the coded image data from the recording medium;*

*image decoding means for decoding the read image data; and*

*control means, connected to each of said photographing means image data encoding means, image data recording means image data reading means, and image decoding means for controlling a displaying of fields such that only one of an even and an odd one of said fields are displayed for a period of time which is longer than a field rate of the electronic camera.*

*9. An electronic camera according to claim 8, wherein the control means comprises:*

*means for controlling the displaying of said one of the even and odd fields for eight field periods in order to achieve a still image.*

*10. An electronic camera according to claim 8, wherein the control means comprises:*

*means for controlling a subsequent displaying of a field opposite to said one of the even and odd fields for said period of time which is longer than the field rate in order to achieve a slow regeneration effect.*

*11. An electronic camera, comprising:*

*a photographing device which captures an image of an object and outputs fields of image data;*

*an image encoder which encodes the image data;*

*a recording medium which stores encoded image data;*

*an image decoder which decodes the encoded image data stored in the recording medium; and*

*a controller, connected to each of said photographing device, image encoder, recording medium, and image decoder which controls a displaying of fields such that only one of an even and an odd one of said fields are displayed for a period of time which is longer than a field rate of the electronic camera.*

*12. An electronic camera according to claim 11, wherein the controller comprises:*

*a control device which controls the displaying of fields such that said one of the even and odd fields are displayed for eight field periods in order to achieve a still image.*

*13. An electronic camera according to claim 11, wherein the controller comprises:*

*a controller which controls a subsequent displaying of a field opposite to said one of the even and odd fields for said period of time which is longer than the field rate in order to achieve a slow regeneration effect.*

*14. A method of capturing and displaying images, comprising the steps of:*

*obtaining, through a lens, a sequence of fields of image information;*

*encoding the image information which has been obtained;*

*storing the image information which has been encoded;*

*decoding the stored image information; and*

*displaying only one of an even and an odd one of said sequence of fields for a period of time which is longer than a field rate of the displaying step.*

*15. A method according to claim 14, wherein the displaying step comprises:*

*displaying said one of the even and odd fields for eight field periods in order to achieve a still image.*

*16. A method according to claim 14, further comprising the step of:*

*subsequently displaying a field opposite to said one of the even and odd fields for said period of time which is longer than the field rate in order to achieve a slow regeneration effect.*

*17. An electronic camera, comprising:*

*a photographing means for photographing an object and outputting fields of image data;*

*image data encoding means for encoding the image data;*

*image recording means for recording the coded image data on a recording medium;*

*image data reading means for reading the coded image data from the recording medium;*

*image decoding means for decoding the read image data; and*

*control means, connected to each of said photographing means image data encoding means image recording means, image data reading means, and image decoding means for controlling a displaying of fields such that during a reverse generation mode, fields are sequentially displayed in an order which is reverse to an order that the fields were photographed.*

*18. An electronic camera, comprising:*

*a photographing device which captures an image of an object and outputs fields of image data;*

*an image encoder which encodes the image data;*

*a recording medium which stores encoded image data;*

*an image decoder which decodes the encoded image data stored in the recording medium; and*

*a controller, connected to each of said photographing device, image encoder, recording medium, and image decoder which controls a displaying of fields such that during a reverse generation mode, fields are sequentially displayed in an order which is reverse to an order that the fields were photographed.*

*19. A method of capturing and displaying images, comprising the steps of:*

*obtaining, through a lens, a sequence of fields of image information;*

*encoding the image information which has been obtained;*

*storing the image information which has been encoded;*

*decoding the stored image information; and*

*sequentially displaying, during a reverse generation mode, fields in an order which is reverse to an order that the fields were photographed.*

*20. An electronic camera, comprising:*

*a photographing means for photographing an object and outputting fields of image data;*

*image data encoding means for encoding the image data;*

*image recording means for recording the encoded image data on a recording medium;*

*image data reading means for reading the encoded image data from the recording medium;*

*image decoding means for decoding the read image data;*

*sound converting means for converting a sound to an electric signal representing the sound;*

*sound encoding means for converting the electric signal representing the sound to encoded sound data;*

*sound data recording means for recording the encoded sound data on the recording medium;*

*sound data reading means for reading the encoded sound data from the recording medium;*

*sound decoding means for decoding the encoded sound data which was read from the recording medium;*

*means for detecting a soundless portion of the sound data which has been decoded;*

*means for placing the camera in a still generation mode; and*

*a control means, connected to the photographing means, the image data encoding means, the image recording means, the image data reading means, the image decoding means, the sound encoding means, the sound data recording means, the sound data reading means, the sound decoding means the means for detecting the soundless portion, and the means for placing the camera in a still generation mode, for controlling a generation of sound such that when a still image is displayed, sound is generated until the soundless portion of the sound data is detected and in response to the detection of the soundless portion, the sound data up to the soundless portion is repeatedly generated.*

*21. An electronic camera, comprising:*

*a photographing device which captures an image of an object and outputs fields of image data;*

*an image encoder which encodes the image data;*

*an image decoder which decodes the encoded image data;*

*a microphone which outputs an electrical signal representing sound;*

*a sound encoder which encodes the electrical signal representing sound into encoded sound data;*

*a sound decoder which decodes the encoded sound data;*

*a recording medium which stores the encoded image data and the encoded sound data; and*

*a controller, connected to each of said photographing device, image encoder, image decoder, sound encoder, sound decoder, and recording medium, which controls a generation of sound such that when a still image is displayed, sound is generated up until a soundless portion and the sound data up to the soundless portion is repeatedly generated.*

*22. A method of capturing and displaying images and sound using an electronic camera, comprising the steps of:*

*obtaining, through a lens, a sequence of fields of image information while capturing sound information through a microphone;*

*encoding the image information which has been obtained;*

*storing the image information which has been encoded;*

*encoding the sound information which has been obtained;*

*storing the sound information which has been encoded;*

*decoding the stored image information;*

*decoding the stored sound information;*

*placing the electronic camera in a still image generation mode;*

*displaying a still image;*

*playing a sequence of the sound information up until a soundless portion while the still image is being displayed; and*

*replaying the sequence of the sound information up until the soundless portion.*

*23. An electronic camera, comprising:*

*a photographing means for photographing an object and outputting fields of image data;*

*image data encoding means for encoding the image data;*

*image recording means for recording the encoded image data on a recording medium;*

*image data reading means for reading the encoded image data from the recording medium;*

*image decoding means for decoding the read image data;*

*sound converting means for converting a sound to an electric signal representing the sound;*

*sound encoding means for converting the electric signal representing the sound to encoded sound data;*

*sound data recording means for recording the encoded sound data on the recording medium;*

*sound data reading means for reading the encoded sound data from the recording medium;*

*sound decoding means for decoding the encoded sound data which was read from the recording medium;*

*means for detecting a soundless portion of the sound data which has been decoded;*

*means for placing the camera in a slow regeneration of images mode; and*

*a control means, connected to the photographing means, the image data encoding means, the image recording means, the image data reading means, the image decoding means, the sound encoding means, the sound data recording means, the sound data reading means, the sound decoding means, the means for detecting the soundless portion, and the means for placing the camera in the slow regeneration mode, for controlling a generation of sound such that when images are displayed in the slow regeneration mode, sound is generated until the soundless portion of the sound data is detected and in response to the detection of the soundless portion, the sound data up to the soundless portion is repeatedly generated.*

*24. An electronic camera, comprising:*

*a photographing device which captures an image of an object and outputs fields of image data;*

*an image encoder which encodes the image data;*

*an image decoder which decodes the encoded image data;*

*microphone which outputs an electrical signal representing sound;*

*a sound encoder which encodes the electrical signal representing sound into encoded sound data;*

*a sound decoder which decodes the encoded sound data;*

*a recording medium which stores the encoded image data and the encoded sound data; and*

*a controller, connected to each of said photographing device, image encoder, image decoder, sound encoder, sound decoder, and recording medium, which controls a generation of sound such that when a slow image regenerating mode is used, sound is generated up until a soundless portion and the sound data up to the soundless portion is repeatedly generated.*

*25. A method of capturing and displaying images and sound using an electronic camera, comprising the steps of:*

*obtaining, through a lens, a sequence of fields of image information while capturing sound information through a microphone;*

*encoding the image information which has been obtained;*

*storing the image information which has been encoded;*

*encoding the sound information which has been obtained;*

*storing the sound information which has been encoded;*

*decoding the stored image information;*

*decoding the stored sound information;*

*placing the electronic camera in a slow image regeneration mode;*

*displaying a sequence of images in the slow image regeneration mode;*

*playing a sequence of the sound information up until a soundless portion while the slow image regeneration mode is being used; and*

*replaying the sequence of the sound information up until the soundless portion.*

*26. An electronic camera, comprising:*

*a photographing means for photographing an object and outputting fields of image data;*

*image data encoding means for encoding the image data;*

*image recording means for recording the encoded image data on a recording medium;*

*image data reading means for reading the encoded image data from the recording medium;*

*image decoding means for decoding the read image data;*

*sound converting means for converting a sound to an electric signal representing the sound;*

*sound encoding means for converting the electric signal representing the sound to encoded sound data;*

*sound data recording means for recording the encoded sound data on the recording medium;*

*sound data reading means for reading the encoded sound data from the recording medium;*

*sound decoding means for decoding the encoded sound data which was read from the recording medium;*

*means for detecting a soundless portion of the sound data which has been decoded;*

*means for placing the camera in a rapid traverse or rewind regeneration of images mode; and*

*a control means, connected to the photographing means the image data encoding means, the image recording means, the image data reading means, the image decoding means, the sound encoding means, the sound data recording means, the sound data reading means, the sound decoding means, the means for detecting the soundless portion, and the means for placing the camera in the rapid traverse or rewind regeneration mode, for controlling a generation of sound such that when images are displayed in the rapid traverse or rewind regeneration mode, sound is generated until the soundless portion of the sound data is detected and in response to the detection of the soundless portion, the sound data up to the soundless portion is repeatedly generated.*

*27. An electronic camera, comprising:*

*a photographing device which captures an image of an object and outputs fields of image data;*

*an image encoder which encodes the image data;*

*an image decoder which decodes the encoded image data;*

*a microphone which outputs an electrical signal representing sound;*

*a sound encoder which encodes the electrical signal representing sound into encoded sound data;*

*a sound decoder which decodes the encoded sound data;*

*a recording medium which stores the encoded image data and the encoded sound data; and*

*a controller, connected to each of said photographing device, image encoder, image decoder, sound encoder, sound decoder, and recording medium, which controls a generation of sound such that when a rapid traverse or rewind image regenerating mode is used, sound is generated up until a soundless portion and the sound data up to the soundless portion is repeatedly generated.*

*28. A method of capturing and displaying images and sound using an electronic camera, comprising the steps of:*

*obtaining, through a lens, a sequence of fields of image information while capturing sound information through a microphone;*

*encoding the image information which has been obtained;*

*storing the image information which has been encoded;*

*encoding the sound information which has been obtained;*

*storing the sound information which has been encoded;*

*decoding the stored image information;*

*decoding the stored sound information;*

*placing the electronic camera in a rapid traverse or rewind image regeneration mode;*

*displaying a sequence of images in the rapid traverse or rewind image regeneration mode;*

*playing a sequence of the sound information up until a soundless portion while the rapid traverse or rewind image regeneration mode is being used; and*

*replaying the sequence of the sound information up until the soundless portion.*

*29. An electronic camera, comprising:*

*a photographing means for photographing an object and outputting fields of image data;*

*image data encoding means for encoding the image data;*

*image recording means for recording the encoded image data on a recording medium;*

*image data reading means for reading the encoded image data from the recording medium;*

*image decoding means for decoding the read image data;*

*sound converting means for converting a sound to an electric signal representing the sound;*

*sound encoding means for converting the electric signal representing the sound to encoded sound data;*

*sound data recording means for recording the encoded sound data on the recording medium;*

*sound data reading means for reading the encoded sound data from the recording medium;*

*sound decoding means for decoding the encoded sound data which was read from the recording medium;*

*means for detecting a soundless portion of the sound data which has been decoded;*

*means for placing the camera in a reverse regeneration of images mode; and*

*a control means, connected to the photographing means, the image data encoding means, the image recording means, the image data reading means, the image decoding means, the sound encoding means, the sound data recording means, the sound data reading means, the sound decoding means, the means for detecting the soundless portion, and the means for placing the camera in the reverse regeneration mode, for controlling a generation of sound such that when images are displayed in the reverse regeneration mode sound is generated until the soundless portion of the sound data is detected and in response to the detection of the soundless portion, the sound data up to the soundless portion is repeatedly generated.*

*30. An electronic camera, comprising:*

*a photographing device which captures an image of an object and outputs fields of image data;*

*an image encoder which encodes the image data;*

*an image decoder which decodes the encoded image data;*

*a microphone which outputs an electrical signal representing sound;*

*a sound encoder which encodes the electrical signal representing sound into encoded sound data;*

*a sound decoder which decodes the encoded sound data;*

*a recording medium which stores the encoded image data and the encoded sound data; and*

*a controller, connected to each of said photographing device, image encoder, image decoder, sound encoder, sound decoder, and recording medium, which controls a generation of sound such that when a reverse image regenerating mode is used, sound is generated up until a soundless portion and the sound data up to the soundless portion is repeatedly generated.*

*31. A method of capturing and displaying images and sound using an electronic camera, comprising the steps of:*

*obtaining, through a lens, a sequence of fields of image information while capturing sound information through a microphone;*

*encoding the image information which has been obtained;*

*storing the image information which has been encoded;*

*encoding the sound information which has been obtained;*

*storing the sound information which has been encoded;*

*decoding the stored image information;*

*decoding the stored sound information;*

*placing the electronic camera in a reverse image regeneration mode;*

*displaying a sequence of images in the reverse image regeneration mode;*

*playing a sequence of the sound information up until a soundless portion while the reverse image regeneration mode is being used; and*

*replaying the sequence of the sound information up until the soundless portion.*

* * * * *